Oct. 14, 1924.
M. L. LATHAM
SOLUTION METER
Filed Aug. 2, 1921
1,511,765
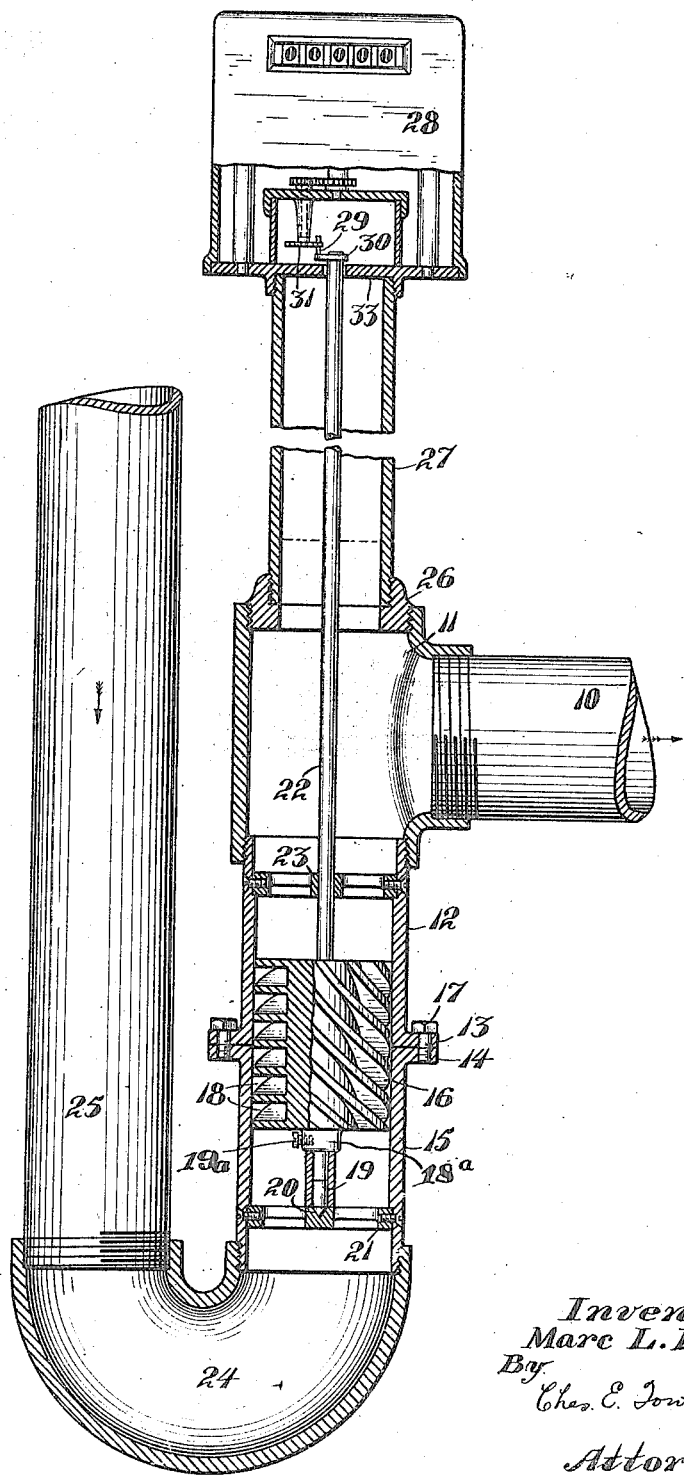
Inventor
Marc L. Latham
By
Chas. E. Townsend
Attorney Patented Oct. 14, 1924.

1,511,765

UNITED STATES PATENT OFFICE.

MARC L. LATHAM, OF ANGELS CAMP, CALIFORNIA.

SOLUTION METER.

Application filed August 2, 1921. Serial No. 489,240.

*To all whom it may concern:*

Be it known that I, MARC L. LATHAM, a citizen of the United States, residing at Angels Camp, in the county of Calaveras and State of California, have invented new and useful Improvements in Solution Meters, of which the following is a specification.

This invention relates to a solution meter. It is a principal object of the present invention to provide a meter for liquid measurement, which meter is particularly adaptable for use in connection with cyanide solutions and the like.

In milling ore by the cyanide method, it is desirable to ascertain the average loss of metal through the tailings of the mill and to check the amount of solution passing through the mill, thus making it possible to very accurately determine the quantity of precious metal recovered, and the present invention is provided as a suitable means for checking the daily performance of the mill; particularly the volume of metal-laden cyanide solution which is handled during the day, and preferably recording this volume in ounces of metal which should be recovered from the solution.

The present invention is particularly designed to operate in a cyanide solution without being detrimentally affected by the chemicals of said solution, thus making it possible to continuously maintain the meter in operation without the necessity of repairs.

The present invention contemplates the use of a flow meter having a spiral rotor around which a liquid may flow, said rotor actuating a registering mechanism at a remote point therefrom, and in a position to be inaccessible to the cyanide solution.

The invention is illustrated by way of example in the accompanying drawing in which the figure is a view in vertical section through the meter with parts broken away for the sake of clearness.

Referring more particularly to the drawing 10 indicates an eduction pipe. This pipe is screwed into the horizontal leg of a pipe T, the lower end of which T receives a cylindrical and vertical casing member 12. This casing is formed with a bolting flange 13 cooperating with a similar flange 14 of a casing 15 to provide an enclosure for a rotor 16. The bolting flanges of the adjacent casings are held together by screws 17. The rotor is formed with a plurality of spiral grooves 18 extending along and around its outer circumference and through which grooves the solution may circulate, at the same time exerting sufficient effort to revolve the rotor. The rotor is cylindrical and substantially fills the inner circumferential bore of the casing members 12 and 15. Its lower end is provided with a hub $18^a$ and a center pin 19 carried in a bearing 20. This bearing is supported by a spider 21 which is secured within the lower end of the casing portion 15 and through which spider the solution is free to circulate. The upper end of the rotor is fitted with a register operating shaft 22 extending upwardly through a spider 23. The lower end of the casing 15 is in communication with a pipe elbow 24 which forms a semi-circular flow passageway from the casing to an induction pipe 25. This pipe is connected with a source of liquid supply, as, for example, a cyanide tank; and it is preferred that the tank be disposed at a height to give a gravity feed of the liquid through the meter and the outlet pipe 10. The hub $18^a$ is fitted with a set screw $19^a$ by means of which it is fixed on the shaft 22. The center pin is formed of hardened metal and serves as step bearing for the end of the shaft 22. The upper end of the pipe T 11 is fitted with a collar 26 to receive a shaft casing 27, and this casing encloses the register operating shaft 22 which extends vertically and terminates within a register casing 28. The register may be of any desired construction, and is preferably calibrated to indicate the tonnage of liquid passing through the meter, the specific gravity of the cyanide solution being taken into consideration in the calculation. By way of example, a trip finger 29 is shown as carried on a lever 30 at the upper end of the shaft 22, this finger engaging the teeth of a star wheel 31 through which the registering mechanism of the meter is actuated. Then length of the pipe 27 is such as to dispose the meter box above the level of the cyanide solution, and to insure that at all times the mechanism of the meter will be held out of possible contact with the cyanide solution, or damage therefrom.

In the operation of the present invention a solution is delivered to the induction pipe 25 where it will flow downwardly around the elbow 24 and upwardly through the casings 12 and 15. The force of the flow will tend to revolve the rotor 16 as the solution strikes the spiral vanes of the rotor and passes therealong. The liquid will then pass upwardly into the pipe T 11 and out through the eduction pipe 10. Care is taken to insure that the level of the liquid is considerably below the bottom wall 33 of the meter box, although it will be evident that the liquid may assume its own level within the shaft casing 27. The parts of the casing 27, the T 11, the circulating pipes 10, 24 and 25, the rotor and its shaft, and the casings 12 and 15 are all of material impervious to the action of the solution passing through the meter and, as the destructive part of the mechanism is embodied in the registering mechanism of the meter, it will be evident that by placing the registering mechanism at a remote point from the remaining mechanism, it is possible to preserve the various parts and eliminate the requirement for renewal and repairs.

While I have shown the preferred form of my invention, it is to be understood that various changes may be made by those skilled in the art without departing from the spirit of my invention.

Having thus described my invention, what I claim and desire to secure by Letters Patent is:

1. A meter comprising a two-part vertical casing split transversely and formed with a cylindrical center bore, a cylindrical rotor disposed within said bore having spiral vanes arranged around the circumference thereof; bearing members at the top and bottom of said casing to receive the shaft of said rotor, a T connection at the upper end of said casing; a horizontal eduction pipe leading therefrom; a vertical supporting column extending from said T in alignment with the rotor casing, said column extending above the level of a liquid flowing through the casing; a register supported at the upper end of said column; and an induction pipe in communication with the lower end of the casing.

2. A meter comprising a cylindrical casing, said casing being formed in two aligned sections of equal length and separably connected together, bearing members at the top and bottom of said casing to turnably receive and support a register operating shaft, a cylindrical rotor having spiral vanes, said rotor being fixed on said shaft and located within said casing at approximately the line of junction of said sections, the ends of said casing being open whereby it may be connected to induction and eduction pipes.

MARC L. LATHAM.